United States Patent Office 3,782,903
Patented Jan. 1, 1974

3,782,903
SUPPORT PILLAR FOR FLUID BED GRID
Walter W. Kramer, Allentown, Pa., assignor to Fuller Company, Catasauqua, Pa.
Filed Aug. 16, 1971, Ser. No. 172,177
Int. Cl. B01j 9/18
U.S. Cl. 23—284                1 Claim

ABSTRACT OF THE DISCLOSURE

A support pillar adapted to be positioned in the plenum chamber of a fluidized solids reactor which is of large size and used for carrying out high temperature reactions. The pillar is made up of a plurality of stackable blocks each of which is provided with a longitudinal bore. Each block has a plurality of recesses on its top surface extending from the longitudinal bore to the outer periphery of the block. The top surface of the block is provided with a raised portion and the bottom surface is provided with a recess adapted to receive the raised portion on the top surface of an adjacent block when the blocks are stacked. When the blocks are stacked, they provide flow passages which provide communication between the plenum chamber and the inside of the column to thereby equalize the temperature throughout the column. The longitudinal bore through the column communicates with passages in the grid of the reactor.

BACKGROUND OF THE INVENTION

This invention relates to fluidized solids reactors and in particular to a support pillar for use with large diameter reactors used for carrying out high temperature reactions.

Grids for fluid solids reactors which are used for high temperature processes are usually made of a ceramic material. The grid may be a single cast piece for small reactors or made up of a plurality of cast ceramic bricks which are bonded in situ to form the grid. The grid is often a form of an arch to give it strength and supported at its periphery by suitable support structures such as the lower part of the reactor. However, in large diameter reactors, the grid must be made up of bonded together bricks. If an arch arrangement is used, the grid becomes very thick at the outer periphery. With known techniques, it is not possible to cast a single block of the thickness required for the outer periphery of the grid. Attempts to use a layered grid have not been satisfactory.

Prior to the present invention, it was known to provide some means in the center of the grid for supporting the grid. However, such prior support arrangements have not been successful in high temperature applications. One prior arrangement for supporting a fluidized bed grid inside the periphery of the grid includes a steel structure. However, such prior arrangements are not the high temperatures encountered in certain reactions carried out in a fluidized solids reactor in which the temperature in the fluid bed reaches 2000° F. and higher.

For high temperature applications, it has been attempted to support the central portion of the grid of a fluid bed reactor by building columns of ceramic blocks. However, these prior columns are not able to withstand the temperatures encountered over long periods of use and failure results. It is believed that the failure results because the ceramic columns were subjected to a high temperature on the outside of the column but the inside of the column remained relatively cool. The difference in temperatures results in eventual cracking and failure of the columns which leads to the collapse of the grid. This is particularly true where the reactor may be started up, subjected to high temperatures, shut down and then restarted.

SUMMARY

It is, therefore, the principal object of this invention to provide arrangement for supporting a fluidized solids reactor grid which is capable of withstanding high temperatures.

It is a further object of this invention to provide an article of manufacture which is adapted to be stacked with similar such articles to form a support column and is capable of withstanding high temperatures.

It is another object of this invention to provide a novel support column for use with large diameter fluidized solids reactors which is capable of withstanding high temperatures over a long period of time and intermittent changes in temperature.

In general, the foregoing and other objects will be carried out by providing a fluidized solids reactor including a vessel having a top, bottom and sidewalls, a grid disposed in and dividing said vessel into an upper material chamber and a lower plenum chamber and adapted to support a bed of material in the material chamber, said grid having a plurality of bores therethrough providing communication between the plenum chamber and the material chamber, means for supporting the periphery of the grid, means for supplying gaseous fluid to the plenum chamber for passage through the bores in the grid to fluidize the material in the material chamber, and an improved means for supporting the grid inside its periphery comprising at least one generally vertical column positioned in the plenum chamber and extending from the bottom of the vessel to the grid; said column including a plurality of stackable blocks each having a longitudinal bore therethrough aligned with the longitudinal bores in the adjacent blocks to provide a longitudinal bore through the column; said column defining at least one passage providing communication between said plenum chamber and the longitudinal bore through the column.

BRIEF DESCRIPTION OF THE DRAWING

The invention will be described in connection with the annexed drawing wherein.

DESCRIPTION OF THE PREFERRED EMBODIMENT

Figure 1:
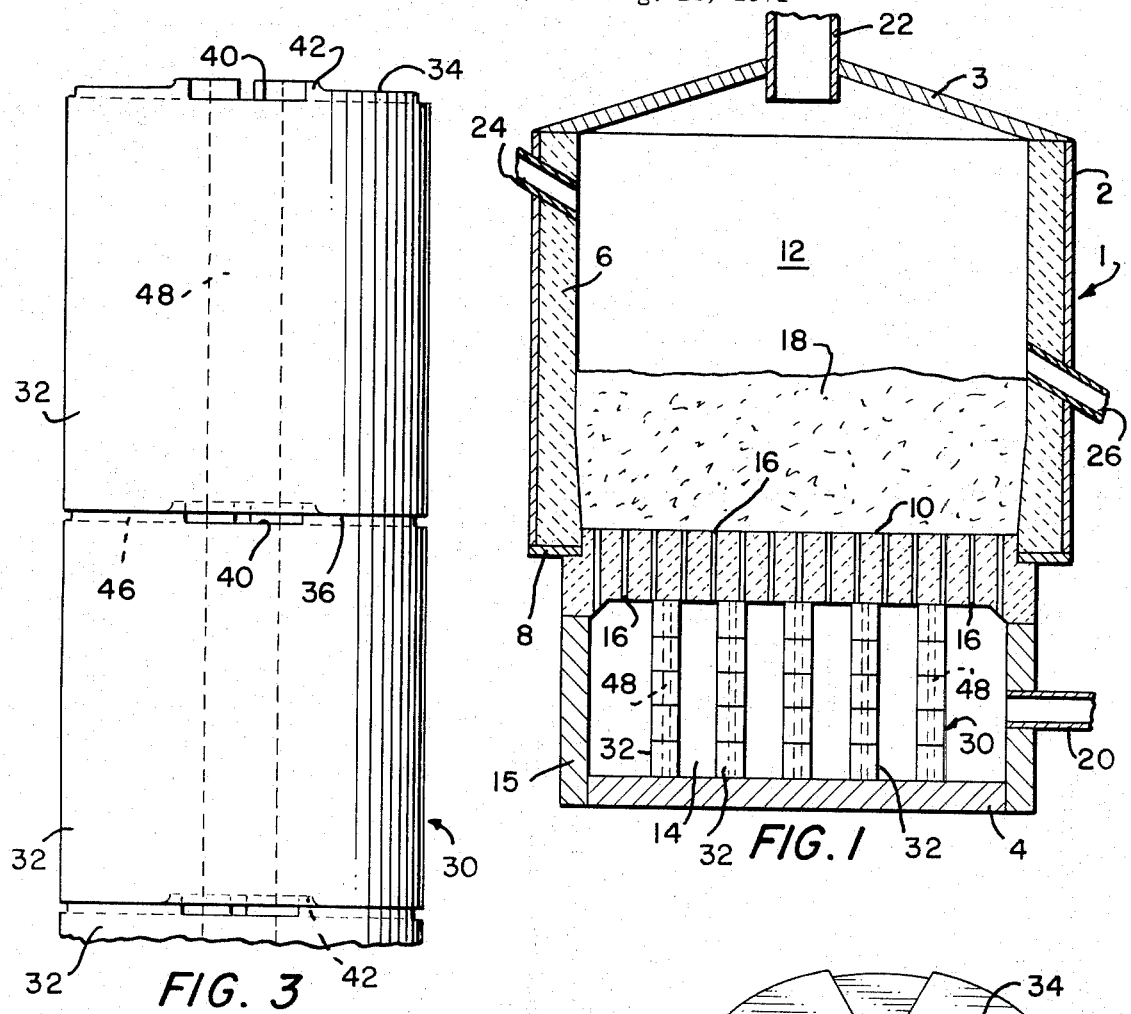
FIG. 1 is a sectional view of a fluidized solids reactor of the present invention.

Referring to FIG. 1, there is shown a fluidized solids reactor generally indicated at 1 which includes a vessel having sidewalls 2, a top 3 and a bottom 4. The sidewalls 2 are lined with a ceramic material 6 which may be supported by annular member 8. The vessel has a gas permeable grid 10 mounted therein dividing the vessel into an upper material chamber 12 and a lower plenum chamber 14. The sidewalls 15 of the plenum 14 may serve to support the periphery of the grid 10. Other arrangements for supporting the periphery of the grid may be used. The grid 10 is provided with a plurality of passages 16 which provide communication between the plenum 14 and material chamber 12. The grid 10 is adapted to support a bed of material 18.

A conduit 20 is provided to supply gaseous fluid from a source (not shown) to the plenum 14 for passage through the passages 16 to fluidize the material in the material chamber. A conduit 22 is provided in the top 3 of the reactor for exhausting gas from the material chamber 12.

The material chamber is provided with an inlet 24 for material and an overflow outlet 26 for discharging material from the fluid bed.

Figure 2:
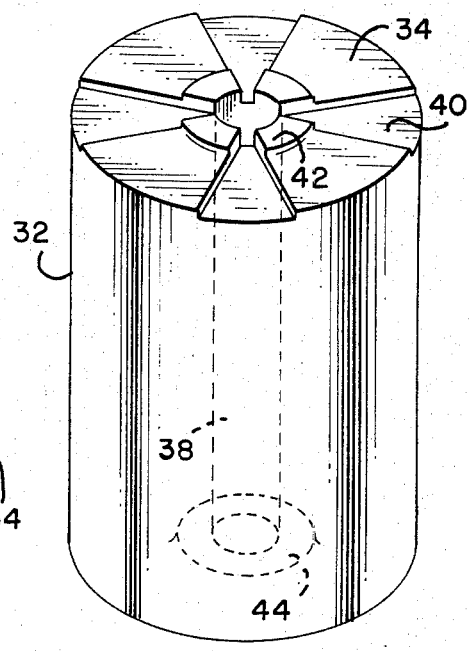
FIG. 2 is a perspective view of a stackable block which forms part of the present invention.

In large diameter reactors, it has been found necessary to support the grid at points inside the periphery of the grid. By the present invention, one or more columns 30 is provided for supporting the grid 10 inside its periphery. Each of these columns is made up of a plurality of stacked blocks generally indicated at 32 and best shown in FIGS. 2 to 4.

In the embodiment shown, the blocks are cylindrical in configuration but it should be understood that they may be of any desired shape such as rectangular. Each of the blocks includes a top surface 34 and a bottom surface 36. A bore 38 extends longitudinally through the block 32 and is preferably on the longitudinal axis thereof. The top surface 34 is provided with at least one and preferably a plurality of recesses 40 which extend from the longitudinal bore 38 to the periphery of the block 32. The top surface 34 is also provided with a raised portion 42 which preferably surrounds the bore 38. The bottom surface 36 is provided with a recess portion 44 which also surrounds the bore 38 and is dimensioned slightly larger than the raised portion 42.

Figures 3, 4:
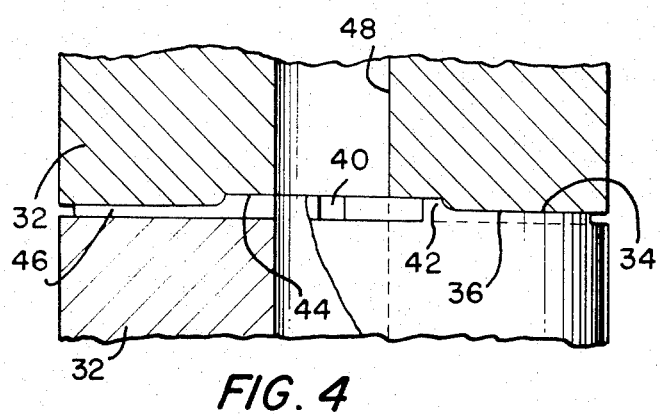
FIG. 3 is a fragmentary elevation on an enlarged scale of a portion of a column of the present invention.
FIG. 4 is a fragmentary sectional view on an enlarged scale on a portion of a column of the present invention.

When the blocks are stacked, as best shown in FIGS. 3 and 4, the recess 44 of an upper block is adapted to receive the raised portion 42 of a lower block. This permits the blocks to be readily stacked and insures that the longitudinal bores 38 of the blocks are aligned. As shown in FIGS. 3 and 4, when the blocks are stacked, the bottom surface 36 rests on the top surface 34 so that the recesses 40 define a flow passage 46 between the plenum chamber 14 and the longitudinal bore 48 of the column which is provided by the coaxially aligned bores 38 of the individual blocks 32. A suitable grout or bonding material may be placed between the surfaces of adjacent blocks.

The columns 30 and the bore 48 are positioned in the plenum chamber so that gaseous fluid which enters the bore 48 through passages 46 will pass through the openings 16 in the grid 10. In this manner, the gaseous fluid which flows through the bore 48 serves to fluidize material above the columns 30 so that no dead spaces occur in the fluid bed. The bore 48 may coincide but need not necessarily be coaxially aligned with a passage 16 in the grid.

If desired, the block 32 directly beneath the grid 10 can have the raised portion 42 removed so that it will provide a more uniform surface to support the grid 10.

It should be apparent from the foregoing that the problems of failure of the support column due to the difference in temperatures between the inside of the column and the outside of the column has been eliminated. The hot gases supplied through conduit 20 to plenum 14 heat the outside of the columns 30. The inside of the columns 30 is heated by the hot gas flowing into the bore 48 through the passages 46. In this manner, the block becomes heated substantially uniformly throughout its thickness and failure due to differences in thermal expansion will not occur.

It is intended that the foregoing description be merely that of a preferred embodiment and that the invention be limited solely by that which is within the scope of the appended claim.

What is claimed is:

1. A fluidized solids reactor including a vessel having a top, bottom and sidewalls, a grid disposed in and dividing said vessel into an upper material chamber and a lower plenum chamber and adapted to support a bed of material in the material chamber, said grid having a plurality of bores therethrough providing communication between the plenum chamber and the material chamber, means for supporting the periphery of the grid, means for supplying gaseous fluid to the plenum chamber for passage through the bores in the grid to fluidize the material in the material chamber, and an improved means for supporting the grid inside its periphery comprising:

at least one generally vertical column positioned in the plenum chamber and extending from the bottom of the vessel to the grid;

said column including a plurality of stackable blocks each having a longitudinal bore therethrough aligned with the longitudinal bores in the adjacent blocks to provide a longitudinal bore through the column;

said column defining at least one passage providing communication between said plenum chamber and the longitudinal bore through the column;

each of said blocks has a top surface and a bottom surface and at least one recess in said bottom surface extending from the longitudinal bore through the block to the outer periphery of the block so that when the blocks are stacked, the recess defines the passage providing communication between the plenum chamber and the longitudinal bore through the column;

the top surface of each of said blocks being provided with a raised portion adjacent the longitudinal bore through the block and the recess in the bottom surface of each block being adjacent the longitudinal bore through the block; the recess in the bottom surface being adapted to receive the raised portion on an adjacent block to thereby enable the blocks to be stacked;

the column and the longitudinal bore therethrough being positioned to coincide with at least one of the holes through the grid to permit gaseous fluid which enters the longitudinal bore through the column to pass through the grid to fluidize material in the material chamber.

References Cited

UNITED STATES PATENTS

| | | | |
|---|---|---|---|
| 3,250,521 | 5/1966 | Sergent | 263—21 A |
| 1,679,993 | 8/1928 | Strack | 263—51 X |
| 1,722,339 | 7/1929 | Pauling | 23—288 R |
| 2,899,286 | 8/1959 | Miller | 23—288 R |
| 3,678,991 | 7/1972 | Blech | 165—9 |

JAMES H. TAYMAN, JR., Primary Examiner

U.S. Cl. X.R.

23—288 S, 277 R; 52—724, 725; 122—13 R; 165—10, 146